US012663059B2

(12) United States Patent
Kawashima et al.

(10) Patent No.: US 12,663,059 B2
(45) Date of Patent: Jun. 23, 2026

(54) UNIT

(71) Applicants: JATCO Ltd, Fuji (JP); NISSAN MOTOR CO., LTD., Yokohama (JP)

(72) Inventors: Kazunori Kawashima, Ebina (JP); Michinori Matsuo, Gotemba (JP); Toshikazu Oshidari, Yokosuka (JP)

(73) Assignees: JATCO Ltd, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/879,936

(22) PCT Filed: May 19, 2023

(86) PCT No.: PCT/JP2023/018795
§ 371 (c)(1),
(2) Date: Dec. 30, 2024

(87) PCT Pub. No.: WO2024/014130
PCT Pub. Date: Jan. 18, 2024

(65) Prior Publication Data
US 2026/0009449 A1     Jan. 8, 2026

(30) Foreign Application Priority Data
Jul. 13, 2022     (JP) ................................. 2022-112102

(51) Int. Cl.
*F16H 3/66*          (2006.01)
(52) U.S. Cl.
CPC ....... *F16H 3/66* (2013.01); *F16H 2200/0039* (2013.01); *F16H 2200/2007* (2013.01);
(Continued)

(58) Field of Classification Search
CPC .............. F16H 3/66; F16H 2200/0039; F16H 2200/2007; F16H 2200/2035; F16H 2200/2066; F16H 2200/2082
See application file for complete search history.

(56) References Cited

U.S. PATENT DOCUMENTS 11,828,351 B1 * 11/2023 Mock ........................ B60K 1/00
2015/0087464 A1 * 3/2015 Mellet ................... F16H 37/022
475/210

(Continued)

FOREIGN PATENT DOCUMENTS

CN         207333597 U     5/2018
DE    10 2013 226 471 A1     6/2015
(Continued)

*Primary Examiner* — Farhana Pervin
(74) *Attorney, Agent, or Firm* — Foley & Lardner LLP

(57) ABSTRACT

Provided is a unit including: an input element; an output element; first to third engagement elements; a first planetary gear mechanism in which the first to third rotational elements are arranged in this order on an alignment chart; and a second planetary gear mechanism in which fourth to sixth rotational elements are arranged in this order on the alignment chart. The input element is connected to the first rotational element, the output element is connected to the second rotational element and the sixth rotational element, one side of the first engagement element is connected to the fifth rotational element, the other side of the first engagement element is fixed, one side of the second engagement element is connected to the third rotational element and the fourth rotational element, the other side of the second engagement element is fixed, and the third engagement element connects two rotational elements that are selected from the first to sixth rotational elements and are not connected to each other.

7 Claims, 5 Drawing Sheets

(52) U.S. Cl.
    CPC ................ *F16H 2200/2035* (2013.01); *F16H 2200/2066* (2013.01); *F16H 2200/2082* (2013.01)

(56)             References Cited

U.S. PATENT DOCUMENTS

2021/0003209 A1*   1/2021   Saito ................... F16H 57/0435
2021/0061252 A1*   3/2021   Hiasa ........................ F16H 3/66

FOREIGN PATENT DOCUMENTS

| DE | 10 2019 107 517 B3 | 7/2020 |
| DE | 10 2019 001 515 A1 | 9/2020 |
| DE | 10 2019 119 947 A1 | 1/2021 |
| DE | 10 2019 119 949 A1 | 1/2021 |

* cited by examiner

| | B1 | B2 | CL1 |
|---|---|---|---|
| FIRST SPEED | ● | | |
| SECOND SPEED | | ● | |
| THIRD SPEED | | | ● |

UNIT

TECHNICAL FIELD

The present invention relates to a unit having a power transmission mechanism therein.

BACKGROUND ART

Patent Document 1 discloses an automatic transmission unit for an electric vehicle with two forward speeds. In the unit, by switching engaged states of two friction clutches, it is possible to achieve a first speed and a second speed having a lower transmission gear ratio (=input rotation speed/output rotation speed) than that of the first speed.

Similar units are disclosed in Patent Documents 2 to 4.

PRIOR ART DOCUMENT

Patent Document

Patent Document 1: German Patent No. 102019107517
Patent Document 2: German Patent Application Publication No. 102019119947
Patent Document 3: German Patent Application Publication No. 102019119949
Patent Document 4: CN207333597U

SUMMARY OF INVENTION

In the automatic transmission unit for an electric vehicle with two forward speeds, a torque amplification effect due to deceleration becomes higher as the transmission gear ratio of the first speed is increased, so that a maximum torque of a motor can be reduced as the transmission gear ratio of the first speed is increased, and a motor having a small size can be selected. On the other hand, the smaller the transmission gear ratio of the second speed, the lower a rotation speed of the motor at the time of achieving a certain vehicle speed, which is advantageous during high-speed cruising.

However, when the transmission gear ratios of the first speed and the second speed are respectively set based on the above design concept, a step ratio (=transmission gear ratio of first speed/transmission gear ratio of second speed) at the time of switching between the first speed and the second speed is increased, and acceleration and deceleration rates of output rotation at the time of shifting is increased.

The present invention has been made in view of such technical problems, and an object of the present invention is to reduce a step ratio at the time of shifting in a unit having a power transmission mechanism therein.

According to an aspect of the present invention, a unit includes:

an input element;
an output element;
a first engagement element;
a second engagement element;
a third engagement element;
a first planetary gear mechanism in which a first rotational element, a second rotational element, and a third rotational element are arranged in this order on an alignment chart; and
a second planetary gear mechanism in which a fourth rotational element, a fifth rotational element, and a sixth rotational element are arranged in this order on the alignment chart.

The input element is connected to the first rotational element.

The output element is connected to the second rotational element and the sixth rotational element.

One side of the first engagement element is connected to the fifth rotational element.

The other side of the first engagement element is fixed.

One side of the second engagement element is connected to the third rotational element and the fourth rotational element.

The other side of the second engagement element is fixed.

The third engagement element connects two rotational elements that are selected from the first to sixth rotational elements and are not connected to each other.

According to the above aspect, three or more gear positions can be achieved by changing engaged states of the first to third engagement elements. As a result, the step ratio is reduced as compared to the unit with two forward speeds, and the acceleration and deceleration rates of the output rotation during shifting can be suppressed to be smaller than that of the unit with two forward speeds. In addition, a more appropriate transmission gear ratio can be set for each gear position.

When the first and second engagement elements are released and the third engagement element is engaged, the transmission gear ratio becomes 1, and all the rotational elements constituting the first and second planetary gear mechanisms rotate at the same rotation speed, so that a power transmission loss caused by differential rotation between the rotational elements can be reduced.

DESCRIPTION OF EMBODIMENTS

Figures 1, 2:
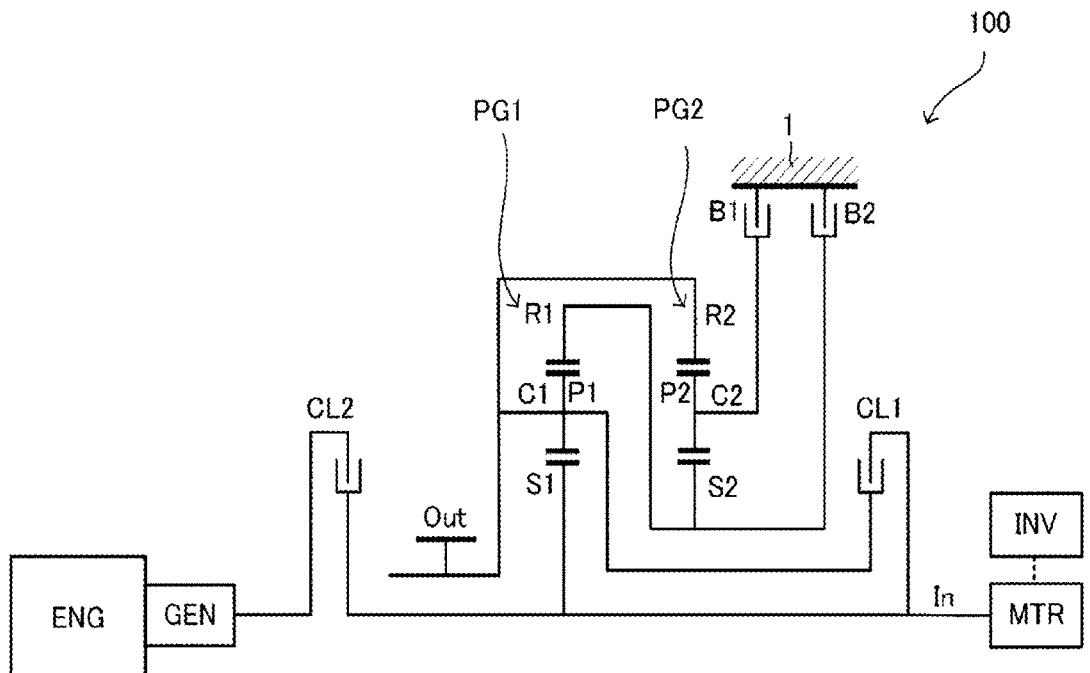
FIG. 1 is a skeleton diagram of a unit according to an embodiment of the present invention.
FIG. 2 is an engagement table showing engaged states of respective engagement elements at respective gear positions.

Hereinafter, embodiments of the present invention will be described with reference to the accompanying drawings. Definitions of terms used in the present description are as follows.

The term of "unit" means a general device having a power transmission mechanism such as a gear mechanism and a differential gear mechanism therein, and includes a motor unit having a motor and a power transmission mechanism, an automatic transmission unit, a reducer unit, and the like.

The term of "transmission gear ratio" is a value obtained by dividing an input rotation speed of the unit by an output rotation speed thereof. The term of "input rotation" includes not only rotation input to the unit from a power source outside the unit but also rotation input to the unit from a power source inside the unit.

The term of "step ratio" is a value obtained by dividing a larger transmission gear ratio (for low speed) by a smaller transmission gear ratio (for high speed) with respect to two transmission gear ratios achieved by the unit.

The term of "axial direction" means an axial direction of a rotating shaft of a component constituting the unit. The component includes a motor, a gear mechanism, a differential gear mechanism, or the like. The term of "radial direction" means a radial direction from a central axis of the rotating shaft.

The term of "housing" means an accommodation body that accommodates a motor, an inverter, and a power transmission mechanism, and includes one or more cases. An aspect in which a case that accommodates the motor, a case that accommodates the inverter, and a case that accommodates the power transmission mechanism are integrally formed is called "3-in-1".

The term of "motor" means a rotating electrical machine having a motor function, and may have a generator function in addition to the motor function.

The expression of "an element A is connected to an element B" means that the element A is connected to the element B on an upstream or downstream side in such a manner that power can be transmitted between the element A and the element B. An input side of the power is the upstream side, and an output side of the power is the downstream side. The element A is not limited to be connected to the element B directly or via another member, and may be connected to the element B via a clutch or the like.

The expression of "the element A is fixed to the element B" includes both an aspect in which the element A is directly fixed to the element B and an aspect in which the element A is fixed to the element B via an element C other than the elements A and B. The expression of "the element A is fixed" means that the element A is fixed to another element and is in a non-rotatable state.

The expression of "the element A and the element B overlap each other when viewed in a predetermined direction" refers to a state in which the element A and the element B are arranged in the predetermined direction (axial direction, radial direction, gravity direction, or the like), and the element A and the element B at least partially overlap each other when observed from the predetermined direction. This is synonymous with the expression of "the element A and the element B overlap in the predetermined direction". In a case where the element A and the element B overlap each other when viewed in the axial direction, the element A and the element B are coaxial. In a case where the element A and the element B are drawn so as to be arranged in the predetermined direction in the drawings, it means that the element A and the element B overlap each other when viewed in the predetermined direction.

On the other hand, the expression of "the element A and the element B do not overlap each other when viewed in the predetermined direction" refers to a state in which the element A and the element B are not arranged in the predetermined direction (axial direction, radial direction, gravity direction, vehicle traveling direction, or the like) and there is no portion at which the element A and the element B overlap each other when viewed from the predetermined direction. This is synonymous with the expression of "the element A and the element B do not overlap each other in the predetermined direction". In a case where the element A and the element B are drawn so as not to be arranged in the predetermined direction in the drawings, it means that the element A and the element B do not overlap each other when viewed in the predetermined direction.

The expression of "the element A is located between the element B and the element C when viewed in the predetermined direction" means that the element A is observed to be between the element B and the element C when observed from the predetermined direction (axial direction, radial direction, gravity direction, or the like). For example, in a case where the element B, the element A, and the element C are arranged in this order along the axial direction, it is observed that the element A is located between the element B and the element C when viewed in the radial direction, so that it can be said that the element A is located between the element B and the element C. The element A does not need to overlap the elements B and C when viewed in the axial direction. In a case where the element A is drawn between the element B and the element C in the drawings, it means that the element A is located between the element B and the element C when viewed in the predetermined direction.

The expression of "the element A is located radially outward (or radially inward) of the element B" means that a radial position of the element A is located outward (or inward) of a radial position of the element B, and includes a case where there is a portion where the element A and the element B overlap each other when viewed in the radial direction, and a case where the element A and the element B have different axial positions and there is no portion where the element A and the element B overlap each other.

The expression of "disposed close to each other" means a state in which there is a portion where two elements overlap each other when viewed in the axial direction or the radial direction, and no other element is sandwiched between the two elements. For example, the expression of "two engagement elements are disposed close to each other" means that no planetary gear mechanism or the like is disposed between the two engagement elements. In a case where no other element is drawn between the element A and the element B in the drawings, it means that the element A and the element B are disposed close to each other.

The terms of "one side of the engagement element" and "the other side of the engagement element" mean two elements included in the engagement element that become relatively non-rotatable when the engagement element is in an engaged state and become relatively rotatable when the engagement element is in a released state. The terms of "one side of the engagement element" and "the other side of the engagement element" may be a combination of rotational elements or a combination of a rotational element and a non-rotational element, and are generally referred to as a clutch for the former and a brake for the latter. Further, the term of "a single side of the engagement element" means either of "one side of the engagement element" and "the other side of the engagement element".

Other terms are appropriately defined in the description.

FIG. 1 is a skeleton diagram illustrating a basic structure of a unit 100 according to an embodiment of the present invention. The unit 100 is an automatic transmission unit with three forward speeds for a hybrid vehicle that shifts rotation input from a motor MTR and/or an engine ENG, which serves as a power source, to an input element In at a transmission gear ratio corresponding to a gear position and transmits the shifted rotation from an output element Out to a drive wheel (not illustrated). In this example, the input element In is a rotating shaft, and the output element Out is a gear.

The unit 100 is a unit in which the input element In, first and second planetary gear mechanisms PG1 and PG2, first to fourth engagement elements B1, B2, CL1, and CL2, the output element Out, and the motor MTR are accommodated in a housing 1. The housing 1 is non-rotatably fixed to the vehicle. The unit 100 may be a 3-in-1 unit in which an inverter INV is also accommodated in the housing 1.

One end of the input element In is connected to an output shaft of the motor MTR, and the input element In rotates by power input from the motor MTR. A rotation speed of the input element In is an input rotation speed of the unit 100. The motor MTR is electrically connected to a battery (not illustrated) outside the unit 100 via the inverter INV, and functions as a motor by receiving power supply from the battery. The motor MTR can also function as a generator.

The other end of the input element In is connected to the engine ENG outside the unit 100 via the fourth engagement element CL2. When the fourth engagement element CL2 is engaged, the input element In can be caused to rotate by an input from the engine ENG. A generator GEN is connected to an output shaft of the engine ENG, and the generator GEN can generate electric power using a part of power of the engine ENG.

The first planetary gear mechanism PG1 is a single pinion planetary gear mechanism including a first sun gear S1 as a first rotational element, a plurality of first pinion gears P1, a first carrier C1 as a second rotational element that rotatably supports the plurality of first pinion gears P1, and a first ring gear R1 as a third rotational element. The first sun gear S1 meshes with the plurality of first pinion gears P1, and the plurality of first pinion gears P1 mesh with the first ring gear R1.

The second planetary gear mechanism PG2 is a single pinion planetary gear mechanism including a second sun gear S2 as a fourth rotational element, a plurality of second pinion gears P2, a second carrier C2 as a fifth rotational element that rotatably supports the plurality of second pinion gears P2, and a second ring gear R2 as a sixth rotational element. The second sun gear S2 meshes with the plurality of second pinion gears P2, and the plurality of second pinion gears P2 mesh with the second ring gear R2.

The first sun gear S1 is connected to the input element In. The first carrier C1 is connected to the second ring gear R2 and the output element Out. The first ring gear R1 is connected to the second sun gear S2.

A rotation speed of the output element Out is an output rotation speed of the unit 100.

The first engagement element B1 is a brake. Here, the first engagement element B1 is implemented by a selectable one-way clutch capable of selecting a one-way clutch state or an engaged state by an electric actuator. The first engagement element B1 may be implemented by a hydraulic clutch or an electric clutch. In a case where two portions of the first engagement element B1 to be engaged when the first engagement element B1 is in the engaged state are defined as one side and the other side, the one side is connected to the second carrier C2, and the other side is fixed to the housing 1. As a result, when the first engagement element B1 is engaged, the second carrier C2 can be fixed to the housing 1.

The second engagement element B2 is a brake. The second engagement element B2 is implemented by a hydraulic clutch or an electric clutch. In a case where two portions of the second engagement element B2 to be engaged when the second engagement element B2 is in the engaged state are defined as one side and the other side, the one side is connected to the first ring gear R1 and the second sun gear S2, and the other side is fixed to the housing 1. As a result, when the second engagement element B2 is engaged, the first ring gear R1 and the second sun gear S2 can be fixed to the housing 1.

The third engagement element CL1 is a clutch. The third engagement element CL1 is implemented by a hydraulic clutch or an electric clutch. In a case where two portions of the third engagement element CL1 to be engaged when the third engagement element CL1 is in the engaged state are defined as one side and the other side, the one side is connected to the input element In and the first sun gear S1, and the other side is connected to the output element Out, the first carrier C1, and the second ring gear R2. As a result, when the third engagement element CL1 is engaged, the input element In and the first sun gear S1 are connected to the output element Out, the first carrier C1, and the second ring gear R2.

FIG. 2 is an engagement table showing relations between the engaged states of the first to third engagement elements B1, B2, and CL1 and gear positions achieved in the unit 100. In the table, a filled circle indicates an engaged state, and no mark indicates a released state.

As shown in the engagement table, a first speed is achieved by engaging the first engagement element B1 and releasing the second and third engagement elements B2 and CL1. A second speed is achieved by engaging the second engagement element B2 and releasing the first and third engagement elements B1 and CL1. A third speed is achieved by engaging the third engagement element CL1 and releasing the first and second engagement elements B1 and B2.

Figure 3:
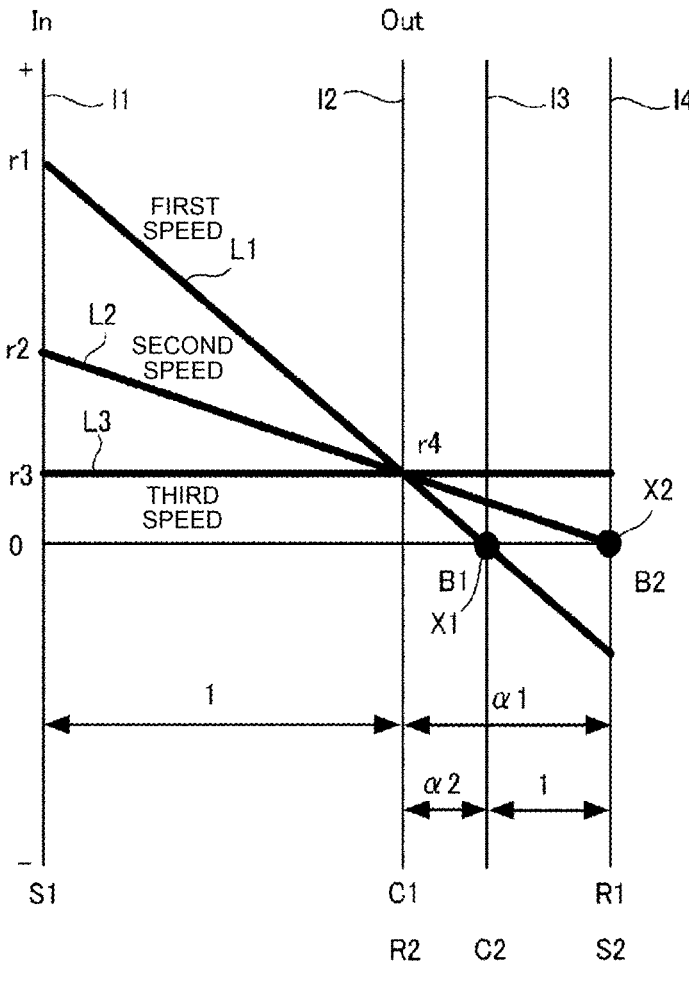
FIG. 3 is an alignment chart of the unit.

FIG. 3 is an alignment chart of the unit 100. In the drawing, vertical lines 11 to 14 correspond to respective rotational elements of the first and second planetary gear mechanisms PG1 and PG2, the first sun gear S1, the first carrier C1, and the first ring gear R1 are arranged in this order from a left side in the drawing for the first planetary gear mechanism PG1, and the second sun gear S2, the second carrier C2, and the second ring gear R2 are arranged in this order from a right side in the drawing for the second planetary gear mechanism PG2.

The first carrier C1 and the second ring gear R2 are connected to each other, so that the same vertical line 12 corresponds thereto. Similarly, the first ring gear R1 and the second sun gear S2 are connected to each other, so that the same vertical line 14 corresponds thereto. An interval α1 between the vertical line 12 and the vertical line 14, when an interval between the vertical line 11 and the vertical line 12 is defined as 1, is a value obtained by dividing the number of teeth of the first sun gear S1 by the number of teeth of the first ring gear R1. An interval α2 between the vertical line 12 and the vertical line 13, when an interval between the vertical line 13 and the vertical line 14 is defined as 1, is a value obtained by dividing the number of teeth of the second sun gear S2 by the number of teeth of the second ring gear R2.

In the alignment chart, straight lines L1 to L3 corresponding to the respective gear positions are drawn. Rotation speeds of respective rotational elements are represented by vertical coordinates of intersections of the straight lines L1 to L3 corresponding to the respective gear positions and the vertical lines 11 to 14.

At the first speed, the second carrier C2 is fixed to the housing 1 by engaging the first engagement element B1, and the rotation speed of the second carrier C2 becomes zero, so that the straight line L1 corresponding to the first speed is a straight line passing through a point X1.

When the rotation speed of the first sun gear S1 is defined as r1 and the rotation speeds of the first carrier C1 and the second ring gear R2 are defined as r4, an input rotation speed rin of the unit 100 is equal to the rotation speed r1 of the first sun gear S1, and an output rotation speed rout thereof is equal to the rotation speeds r4 of the first carrier C1 and the second ring gear R2, so that the transmission gear ratio at the first speed satisfies rin/rout=r1/r4.

In addition, at the second speed, the first ring gear R1 and the second sun gear S2 are fixed to the housing 1 by engaging the second engagement element B2, and the rotation speeds of the first ring gear R1 and the second sun gear S2 become zero, so that the straight line L2 corresponding to the second speed is a straight line passing through a point X2.

When the rotation speed of the first sun gear S1 is defined as r2 and the rotation speeds of the first carrier C1 and the second ring gear R2 are defined as r4, the input rotation speed rin of the unit 100 is equal to the rotation speed r2 of the first sun gear S1, and the output rotation speed rout thereof is equal to the rotation speeds r4 of the first carrier C1 and the second ring gear R2, so that the transmission gear ratio at the second speed satisfies rin/rout=r2/r4. Since r2 is smaller than r1, the transmission gear ratio of the second speed is smaller than the transmission gear ratio of the first speed.

Further, at the third speed, the input element In and the first sun gear S1 are connected to the output element Out, the first carrier C1, and the second ring gear R2 by engaging the third engagement element CL1, so that the rotation speeds of the respective rotational elements are all equal to r3. As a result, the input rotation speed rin and the output rotation speed rout also become equal to each other, and the transmission gear ratio at the third gear is 1, which is smaller than that at the second speed.

Therefore, in the unit 100, three gear positions including the third speed at which the transmission gear ratio is 1 can be achieved, so that the step ratio is reduced as compared to the unit with two forward speeds, and the acceleration and deceleration rates of the output rotation at the time of shifting can be suppressed to be smaller than that of the unit with two forward speeds. In addition, since the first to third speeds can be used for low speed, medium speed, and high speed, respectively, an appropriate transmission gear ratio can be set according to a speed range.

At the third speed, the transmission gear ratio is 1. That is, all the rotational elements constituting the first and second planetary gear mechanisms PG1 and PG2 rotate at the same rotation speed, so that a power transmission loss caused by differential rotation between the rotational elements can be reduced. In addition, the input element In and the output element Out are connected, a power transmission path from the input element In to the output element Out becomes the shortest, and the power transmission loss can be further reduced.

Figure 4:
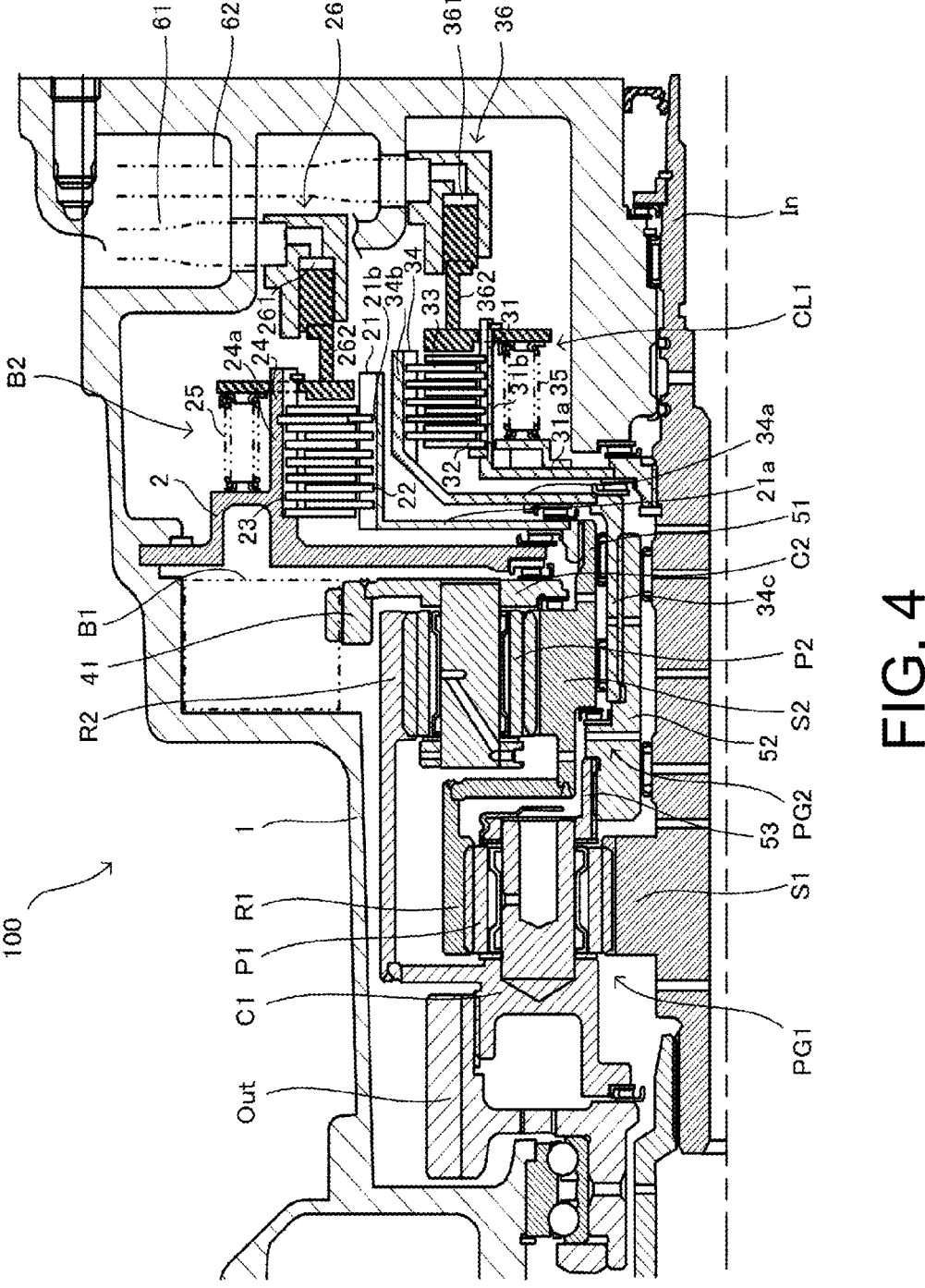
FIG. 4 is a cross-sectional view of a specific configuration example of the unit.

FIG. 4 illustrates a cross section of a specific configuration example of the unit corresponding to the skeleton diagram of FIG. 1. Elements already described are denoted by the same reference numerals.

Connection relations of the respective rotational elements of the first and second planetary gear mechanisms PG1 and PG2, the input element In, and the output element Out are the same as those in the skeleton diagram of FIG. 1, so that the description thereof will be omitted, and specific configurations of the first to third engagement elements B1, B2, and CL1 not illustrated in the skeleton diagram of FIG. 1 will be mainly described.

The first engagement element B1 is a selectable one-way clutch in this configuration example. The first engagement element B1 is implemented by a pair of ratchet mechanisms that can switch an operation state by an electric actuator (not illustrated) and restrict rotation in different directions. A receiving portion 41 is provided on an outer edge of the second carrier C2, and a plurality of recesses for receiving claws of the pair of ratchet mechanisms of the first engagement element B1 are provided on an outer periphery of the receiving portion 41 side by side in a circumferential direction.

When only one of the pair of ratchet mechanisms is caused to operate, the first engagement element B1 enters the one-way clutch state, and the second carrier C2 becomes rotatable only in one direction. In addition, when both of the pair of ratchet mechanisms are caused to operate, the first engagement element B1 enters the engaged state, and the second carrier C2 is fixed to the housing 1 via the first engagement element B1.

The first engagement element B1 is an engagement element to be engaged at the time of achieving the first speed, that is, an engagement element in which the number of scenes in which an engagement capacity (also referred to as a "torque capacity" in the sense of a transmittable torque, and the same applies hereinafter) is required to be controlled is small, so that smooth starting performance can be ensured even when the first engagement element B1 is implemented by a one-way clutch. In addition, the configuration of the unit 100 can be simplified as compared with a case where a multi-plate clutch is used.

Further, since the first engagement element B1 is configured such that not only the one-way clutch state but also the engaged state can be selected, the first speed can be used as a reverse gear when the motor MTR is caused to rotate reversely to cause the vehicle to travel backward.

The first engagement element B1 may be configured to be able to further select a released state. In addition, the first engagement element B1 may be implemented by a hydraulic multi-plate clutch or an electric multi-plate clutch like other engagement elements.

The second engagement element B2 is a hydraulic multi-plate clutch in this configuration example. The second engagement element B2 includes a hub 21, a plurality of inner friction plates 22 and outer friction plates 23 disposed in a staggered manner, a drum 24, a return spring 25, and a hydraulic actuator 26.

The hub 21 has a bottomed cylindrical shape including a base portion 21a and a cylindrical portion 21b extending in the axial direction from an outer edge of the base portion 21a. The inner friction plates 22 are spline-fitted to an outer periphery of the cylindrical portion 21b, and the inner friction plates 22 are relatively displaceable and relatively non-rotatable in the axial direction with respect to the cylindrical portion 21b. An inner periphery of the base portion 21a is spline-fitted to a connection portion 51 extending in the axial direction from the second sun gear S2, whereby the hub 21 and the second sun gear S2 are relatively non-rotatable.

The drum 24 has a cylindrical shape including a cylindrical portion 24a. The outer friction plates 23 are spline-fitted to an inner periphery of the cylindrical portion 24a so as to be movable in the axial direction, and the outer friction plates 23 are relatively displaceable and relatively non-rotatable in the axial direction with respect to the cylindrical portion 24a.

One end of the drum 24 is fixed to an intermediate wall 2 as a wall portion extending inward from the housing 1. In this example, the drum 24 and the intermediate wall 2 are integrally formed.

The intermediate wall 2 has a portion located between the first engagement element B1 and the second engagement element B2 when viewed in the radial direction. By fixing the drum 24 of the second engagement element B2 to such an intermediate wall 2, the second engagement element B2 can be fixed to the housing 1 without difficulty while taking advantage of an empty space in the housing 1. In addition, the intermediate wall 2 has, on an inner peripheral side thereof, an opening through which the input element In, a later-described connection portion 34c of a drum 34 of the third engagement element CL1, a later-described intermediate member 52, and a later-described connection portion 51 of the second sun gear S2 are inserted.

The hydraulic actuator 26 is an actuator that drives the second engagement element B2. The hydraulic actuator 26 is connected to an electric hydraulic supply unit (not illustrated) via a flexible pipe 61. The hydraulic supply unit is attached to an outer periphery of the housing 1 or the like. When oil is supplied from the hydraulic supply unit to an oil chamber 261, a piston 262 is pushed out in the axial direction, the inner friction plates 22 and the outer friction plates 23 are pressed against each other and are relatively non-rotatable, and the second engagement element B2 enters the engaged state.

The return spring 25 is disposed between the piston 262 and the intermediate wall 2. In a state where oil is not supplied to the oil chamber 261, the piston 262 is pushed back by a spring force of the return spring 25 to separate the inner friction plates 22 and the outer friction plates 23 from each other, and the second engagement element B2 enters the released state.

The third engagement element CL1 is a hydraulic multi-plate clutch in this configuration example. The third engagement element CL1 includes a hub 31, a plurality of inner friction plates 32 and outer friction plates 33 disposed in a staggered manner, the drum 34, a return spring 35, and a hydraulic actuator 36.

The hub 31 has a bottomed cylindrical shape including a base portion 31a and a cylindrical portion 31b extending in the axial direction from an outer edge of the base portion 31a. The inner friction plates 32 are spline-fitted to an outer periphery of the cylindrical portion 31b, and the inner friction plates 32 are relatively displaceable and relatively non-rotatable in the axial direction with respect to the cylindrical portion 31b. An inner periphery of the base portion 31a is spline-fitted to the input element In, whereby the hub 31 and the input element In are relatively non-rotatable.

The drum 34 has a stepped cylindrical shape including a base portion 34a, a cylindrical portion 34b extending in the axial direction from an outer edge of the base portion 34a, and a connection portion 34c extending from an inner edge of the base portion 34a in a direction opposite to the cylindrical portion 34b. The outer friction plates 33 are spline-fitted to an inner periphery of the cylindrical portion 34b so as to be movable in the axial direction, and the outer friction plates 33 are relatively displaceable and relatively non-rotatable in the axial direction with respect to the cylindrical portion 34b.

The connection portion 34c is spline-fitted to one end of the intermediate member 52 disposed between the input element In and the second sun gear S2 in a relatively non-rotatable manner, and the other end of the intermediate member 52 is spline-fitted to a connection portion 53 extending in the axial direction from the first carrier C1 in a relatively non-rotatable manner. As a result, the drum 34 and the first carrier C1 are relatively non-rotatable.

The hydraulic actuator 36 is an actuator that drives the third engagement element CL1. The hydraulic actuator 36 is connected to an electric hydraulic supply unit (not illustrated) via a flexible pipe 62. The hydraulic supply unit is attached to the outer periphery of the housing 1 or the like. When oil is supplied from the hydraulic supply unit to an oil chamber 361, a piston 362 is pushed out in the axial direction, the inner friction plates 32 and the outer friction plates 33 are pressed against each other and are relatively non-rotatable, and the third engagement element CL1 enters the engaged state.

The return spring 35 is disposed between the piston 362 and the hub 31. In a state where oil is not supplied to the oil chamber 361, the piston 362 is pushed back by a spring force of the return spring 35 to separate the inner friction plates 32 and the outer friction plates 33 from each other, and the third engagement element CL1 enters the released state.

In the example illustrated in FIG. 4, the supply of oil to the oil chambers 261 and 361 is controlled by the electric hydraulic supply units, respectively, but a control valve unit including a spool, a solenoid valve, and the like may be provided, and the supply of oil to the oil chambers 261 and 361 may be controlled by the control valve unit.

Instead of the hydraulic actuators 26 and 36, an electric actuator that drives the piston by a motor may be provided. In this case, the electric actuator mechanically applies a force to the piston, and thus receives a reaction force equal to the force from the piston. Therefore, in a case where the electric actuator is used, the electric actuator is fixed at a position where a reaction force can be received, such as the housing 1.

Relative positional relations of the first to third engagement elements B1, B2, and CL1 are as follows.

The first engagement element B1 is disposed radially outward as viewed from the second planetary gear mechanism PG2, and has a portion overlapping the second planetary gear mechanism PG2 when viewed in the radial direction. As a result, a dimension of the unit 100 in the axial direction can be reduced.

In addition, the second engagement element B2 is disposed radially outward of the third engagement element CL1 and has a portion overlapping the third engagement element CL1 when viewed in the radial direction. As a result, the dimension of the unit 100 in the axial direction can be reduced.

Further, the hydraulic actuator 26 of the second engagement element B2 is disposed radially outward as viewed from the hydraulic actuator 36 of the third engagement element CL1, and has a portion overlapping the hydraulic actuator 36 when viewed in the radial direction. As a result, the dimension of the unit 100 in the axial direction can be reduced.

According to this disposition, the second engagement element B2, the third engagement element CL1, and the hydraulic actuators 26 and 36 are collectively disposed close to each other in one place, and the first planetary gear mechanism PG1 and the second planetary gear mechanism PG2 can be efficiently laid out. That is, the first planetary gear mechanism PG1 and the second planetary gear mechanism PG2 are disposed close to each other and it is possible to avoid an inefficient layout in which and other elements such as the engagement element and the actuator are disposed therebetween.

Next, modifications of the unit 100 will be described.

FIGS. 5A to 5D are skeleton diagrams of the modifications of the unit 100. A position of the third engagement element CL1 is different from that in the skeleton diagram illustrated in FIG. 1. The same elements as those in the skeleton diagram illustrated in FIG. 1 are denoted by the same reference numerals.

It is sufficient that the third engagement element CL1 is engaged to achieve a transmission gear ratio 1, and thus the position of the third engagement element CL1 may be a position other than that illustrated in FIG. 1.

Specifically, in order to achieve the transmission gear ratio 1 in the alignment chart illustrated in FIG. 3, it is sufficient that the straight line L3 corresponding to the third speed is horizontal, so that any two of the four vertical lines may be selected and rotational elements corresponding to the selected two vertical lines may be connected to each other.

In other words, a combination of two rotational elements that are not connected to each other may be selected from all combinations in a case of selecting two rotational elements from the six rotational elements S1, C1, R1, S2, C2, and R2 of the first and second planetary gear mechanisms PG1 and PG2, except for the combinations already connected (first carrier C1 and second ring gear R2, and first ring gear R1 and second sun gear S2), and the two rotational elements may be connected to each other.

Figure 5A:
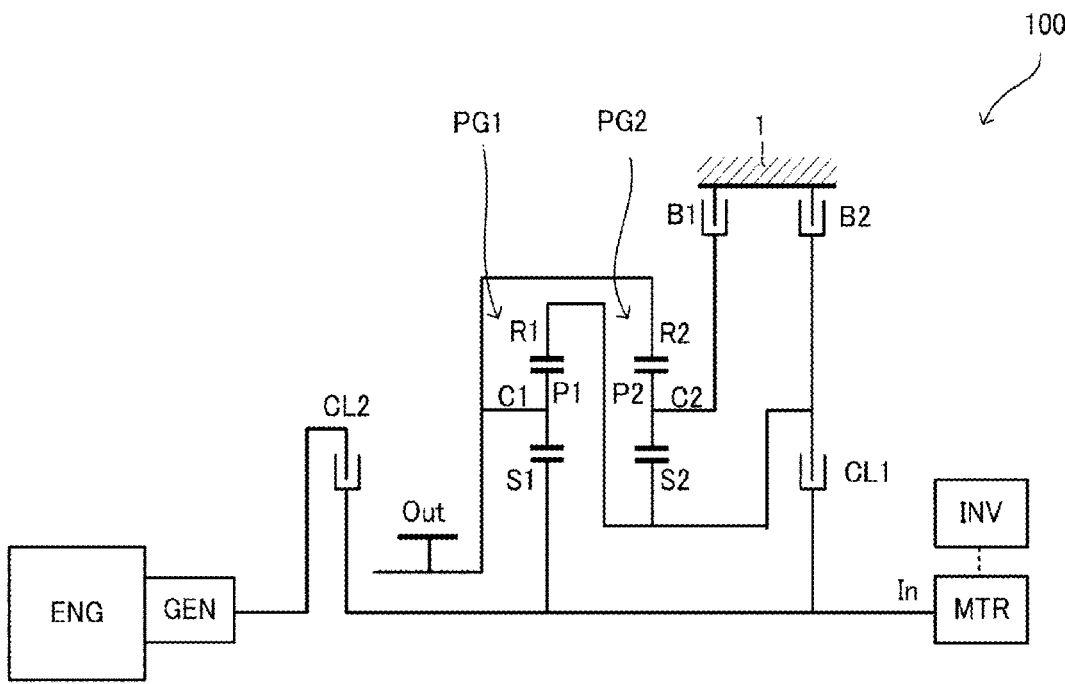
FIG. 5A is a skeleton diagram of a modification of the unit.

In the modification illustrated in FIG. 5A, the third engagement element CL1 is disposed at a position where the input element In and the first sun gear S1 can be connected to the first ring gear R1 and the second sun gear S2.

Figure 5B:
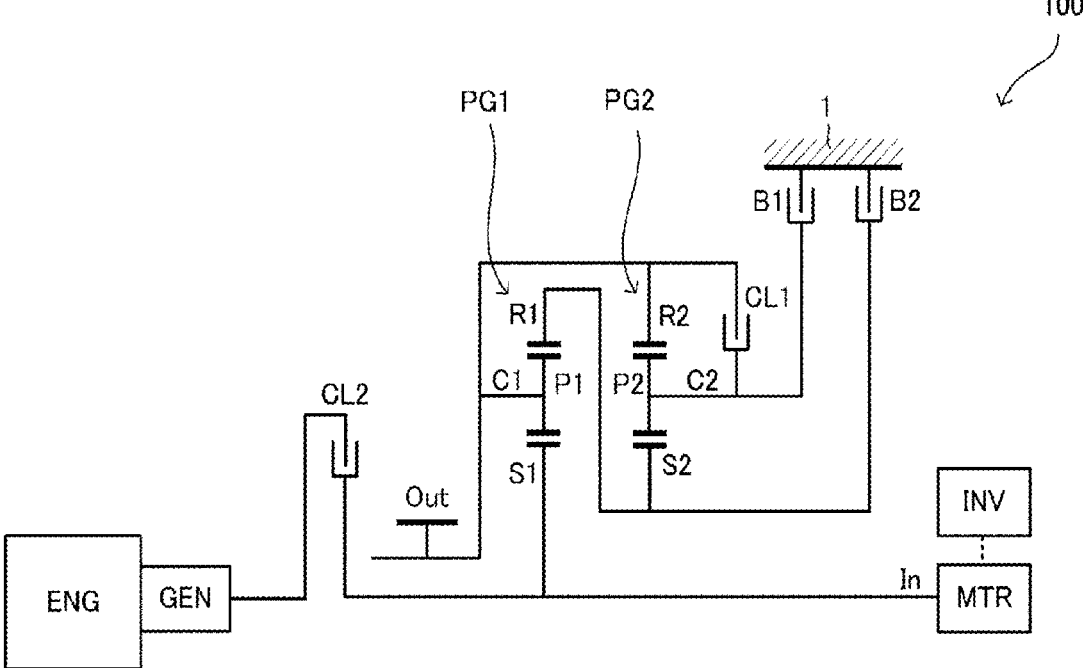
FIG. 5B is a skeleton diagram of a modification of the unit.

In the modification illustrated in FIG. 5B, the third engagement element CL1 is disposed at a position where the second carrier C2 can be connected to the output element Out, the first carrier C1, and the second ring gear R2.

Figure 5C:
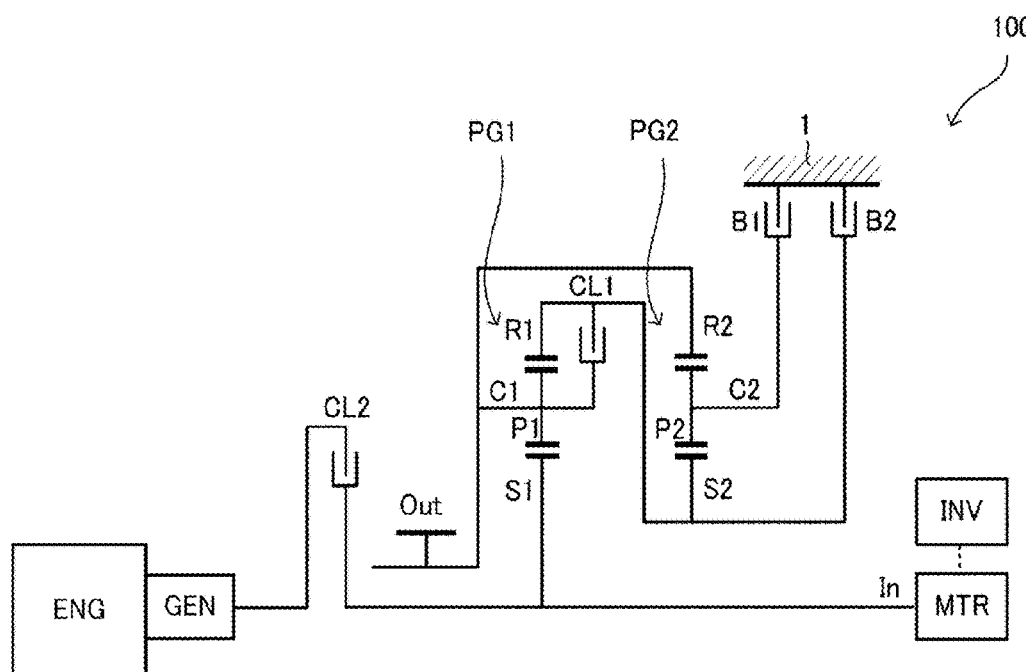
FIG. 5C is a skeleton diagram of a modification of the unit.

In the modification illustrated in FIG. 5C, the third engagement element CL1 is disposed at a position where the first ring gear R1 and the second sun gear S2 can be connected to the output element Out, the first carrier C1, and the second ring gear R2.

Figure 5D:
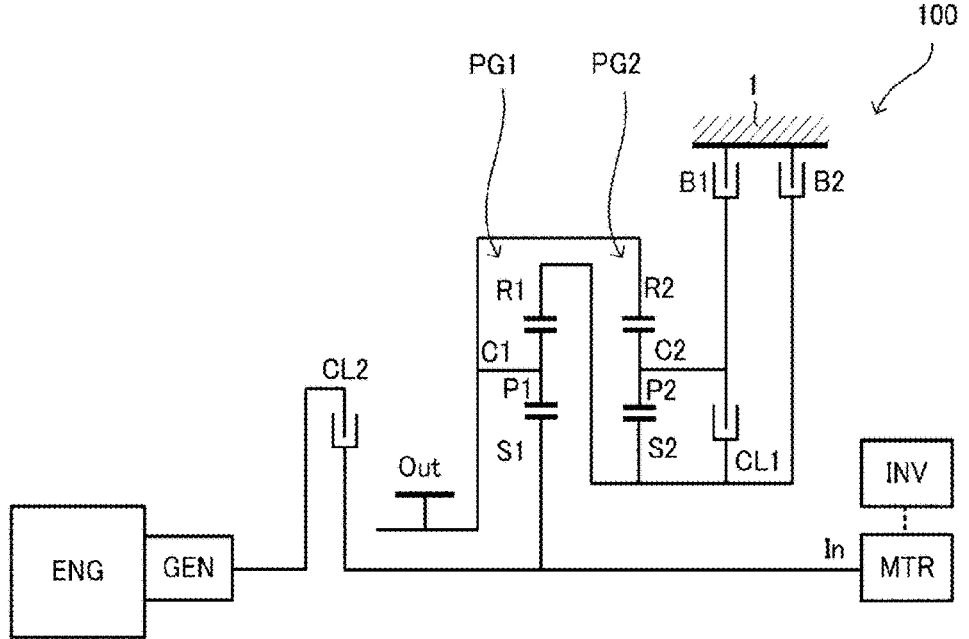
FIG. 5D is a skeleton diagram of a modification of the unit.

In the modification illustrated in FIG. 5D, the third engagement element CL1 is disposed at a position where the first ring gear R1 and the second sun gear S2 can be connected to the second carrier C2.

According to this disposition, a single side of the third engagement element CL1 and one side of the first engagement element B1 or one side of the second engagement element B2 are connected to each other, and thus these can be used as a common component (integrated component). Accordingly, the number of components of the unit 100 can be reduced.

Engagement tables and alignment charts of the modifications illustrated in FIGS. 5A to 5C are the same as those of the skeleton diagram of FIG. 1 illustrated in FIGS. 2 and 3.

Next, operations and effects of the embodiment of the present invention will be described.

(1) The unit 100 according to the embodiment of the present invention includes:

the input element In;

the output element Out;

the first engagement element B1;

the second engagement element B2;

the third engagement element CL1;

the first planetary gear mechanism PG1 in which the first sun gear S1, the first carrier C1, and the first ring gear R1 are arranged in this order on the alignment chart; and the second planetary gear mechanism PG2 in which the second sun gear S2, the second carrier C2, and the second ring gear R2 are arranged in this order on the alignment chart.

The input element In is connected to the first sun gear S1.

The output element Out is connected to the first carrier C1 and the second ring gear R2.

One side of the first engagement element B1 is connected to the second carrier C2.

The other side of the first engagement element B1 is fixed.

One side of the second engagement element B2 is connected to the first ring gear R1 and the second sun gear S2.

The other side of the second engagement element B2 is fixed.

The third engagement element CL1 connects two rotational elements that are selected from the first sun gear S1, the first carrier C1, the first ring gear R1, the second sun gear S2, the second carrier C2, and the second ring gear R2 and are not connected to each other.

According to this configuration, three or more gear positions can be achieved by changing the engaged states of the first to third engagement elements B1, B2, and CL1. As a result, the step ratio is reduced as compared to the unit with two forward speeds, and the acceleration and deceleration rates of the output rotation during shifting can be suppressed to be smaller than that of the unit with two forward speeds. In addition, a more appropriate transmission gear ratio can be set for each gear position.

When the first and second engagement elements B1 and B2 are released and the third engagement element CL1 is engaged, the transmission gear ratio becomes 1, and all the rotational elements constituting the first and second planetary gear mechanisms PG1 and PG2 rotate at the same rotation speed, so that a power transmission loss caused by differential rotation between the rotational elements can be reduced.

(2) In the example illustrated in FIG. 1, the third engagement element CL1 connects the input element In and the output element Out.

According to this configuration, when the third engagement element CL1 is engaged, the input element In and the output element Out are connected to each other. The power transmission path from the input element In to the output element Out becomes the shortest, and the power transmission loss can be further reduced.

(3) In the example illustrated in FIG. 4, the first engagement element B1 is configured to be selectable between the one-way clutch state and the engaged state.

The second engagement element B2 is implemented by a multi-plate clutch.

The third engagement element CL1 is implemented by a multi-plate clutch.

The first engagement element B1 is an engagement element to be engaged at the time of achieving the first speed, that is, an engagement element in which the number of scenes in which the engagement capacity is required to be controlled is small, so that when the first engagement element B1 is implemented by a one-way clutch, the configuration of the unit 100 can be simplified while ensuring smooth starting performance.

In addition, since the second and third engagement elements B2 and CL1, of which the engagement capacity is required to be controlled at the time of shifting, are implemented by multi-plate clutches capable of controlling the engagement capacity, the acceleration and deceleration rates of the output rotation at the time of shifting when the speed is shifted to the second speed and the third speed can be suppressed to be small.

Further, since the first engagement element B1 is configured such that not only the one-way clutch state but also the engaged state can be selected, the first speed can be used as a reverse gear when the motor MTR is caused to rotate reversely to cause the vehicle to travel backward.

(4) In the example illustrated in FIG. 4, the second engagement element B2 has a portion overlapping the third engagement element CL1 when viewed in the radial direction.

According to this configuration, the dimension of the unit 100 in the axial direction can be reduced.

(5) In the example illustrated in FIG. 4, the hydraulic actuator 26 that drives the second engagement element B2 has a portion overlapping the hydraulic actuator 36 that drives the third engagement element CL1 when viewed in the radial direction.

According to this configuration, the dimension of the unit 100 in the axial direction can be reduced.

In addition, since both configurations of (4) and (5) are provided, the second engagement element B2, the third engagement element CL1, and the hydraulic actuators 26 and 36 can be collectively disposed in one place, and the first planetary gear mechanism PG1 and the second planetary gear mechanism PG2 can be efficiently laid out. That is, the first planetary gear mechanism PG1 and the second planetary gear mechanism PG2 are disposed close to each other and it is possible to avoid an inefficient layout in which components of the engagement element and the like are disposed therebetween.

(6) In the example illustrated in FIG. 4, the first engagement element B1 has a portion overlapping the second planetary gear mechanism PG2 when viewed in the radial direction.

According to this configuration, the dimension of the unit 100 in the axial direction can be reduced.

(7) In the example illustrated in FIG. 4, the other side of the second engagement element B2 is fixed to the intermediate wall 2, and the intermediate wall 2 has a portion located between the first engagement element B1 and the second engagement element B2.

According to this configuration, the second engagement element B2 can be fixed to the housing 1 without difficulty while taking advantage of an empty space in the housing 1.

Although the embodiment of the present invention has been described above, the above embodiment merely exemplifies application examples of the present invention and does not intend to limit the technical scope of the present invention to the specific configurations of the above embodiment.

For example, the skeleton diagrams illustrated in FIGS. 1 and 5A to 5C are some of the application examples of the present invention, and the skeleton diagram of the unit to which the present invention is applied is not limited thereto.

In addition, in the above embodiment, the unit 100 is used for a hybrid vehicle, but may be used for an electric vehicle without the engine ENG.

Further, the first planetary gear mechanism PG1 and the second planetary gear mechanism PG2 are each a single pinion planetary gear mechanism, but may be double-pinion planetary gear mechanisms.

The present application claims a priority of Japanese Patent Application No. 2022-112102 filed with the Japan Patent Office on Jul. 13, 2022, all the contents of which are hereby incorporated by reference.

DESCRIPTION OF REFERENCE SIGNS

1 housing
2 intermediate wall (wall portion)
26 hydraulic actuator (actuator)
36 hydraulic actuator (actuator)
100 unit B1 first engagement element
B2 second engagement element
CL1 third engagement element
CL2 fourth engagement element
S1 first sun gear (first rotational element)
C1 first carrier (second rotational element)
R1 first ring gear (third rotational element)
S2 second sun gear (fourth rotational element)
C2 second carrier (fifth rotational element)
R2 second ring gear (sixth rotational element)
In input element
Out output element
PG1 first planetary gear mechanism
PG2 second planetary gear mechanism

The invention claimed is:

1. A unit comprising:
an input element;
an output element;
a first engagement element;
a second engagement element;
a third engagement element;
a first planetary gear mechanism in which a first rotational element, a second rotational element, and a third rotational element are arranged in this order on an alignment chart; and
a second planetary gear mechanism in which a fourth rotational element, a fifth rotational element, and a sixth rotational element are arranged in this order on the alignment chart, wherein
the input element is connected to the first rotational element,
the output element is connected to the second rotational element and the sixth rotational element,
one side of the first engagement element is connected to the fifth rotational element,
the other side of the first engagement element is fixed,
one side of the second engagement element is connected to the third rotational element and the fourth rotational element,
the other side of the second engagement element is fixed, and
the third engagement element connects; any of
(i) the first rotational element and the second rotational element,
(ii) the second rotational element and the fifth rotational element,
(iii) the second rotational element and the third rotational element, or
(iv) the third rotational element and the fifth rotational element.

2. The unit according to claim 1, wherein
the third engagement element connects the input element and the output element.

3. The unit according to claim 1, wherein
the first engagement element is configured to be selectable between a one-way clutch state and an engaged state,
the second engagement element is implemented by a multi-plate clutch, and
the third engagement element is implemented by a multi-plate clutch.

4. The unit according to claim 1, wherein
the second engagement element has a portion overlapping the third engagement element when viewed in a radial direction.

5. The unit according to claim 4, wherein an actuator that drives the second engagement element has a portion overlapping an actuator that drives the third engagement element when viewed in the radial direction.

6. The unit according to claim 1, wherein the first engagement element has a portion overlapping the second planetary gear mechanism when viewed in a radial direction.

7. The unit according to claim 1, wherein the other side of the second engagement element is fixed to a wall portion, and the wall portion has a portion located between the first engagement element and the second engagement element.

\* \* \* \* \*